Figure 1:
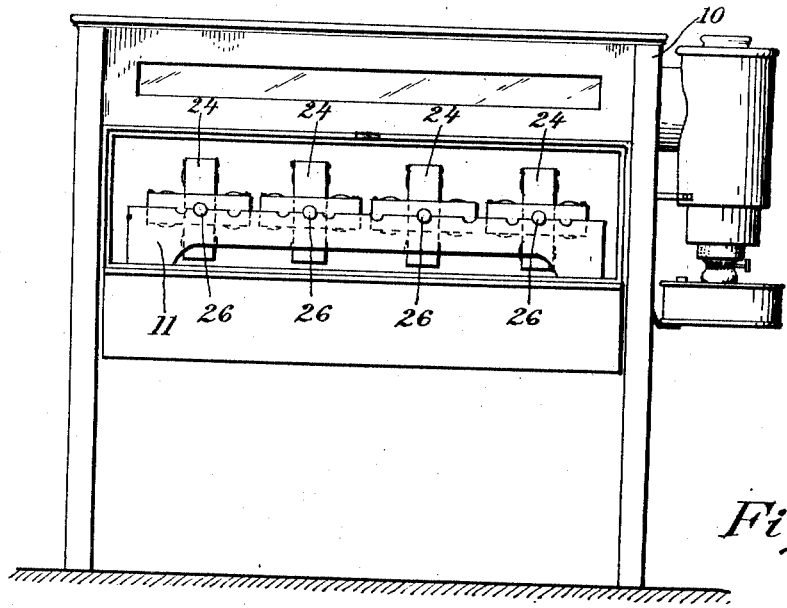

S. J. CARR.
EGG TRAY FOR INCUBATORS.
APPLICATION FILED FEB. 5, 1919.

1,334,225.

Patented Mar. 16, 1920.
3 SHEETS—SHEET 1.

Inventor
S. J. Carr
By
Attorneys.

S. J. CARR.
EGG TRAY FOR INCUBATORS.
APPLICATION FILED FEB. 5, 1919.
1,334,225.
Patented Mar. 16, 1920.
3 SHEETS—SHEET 2.
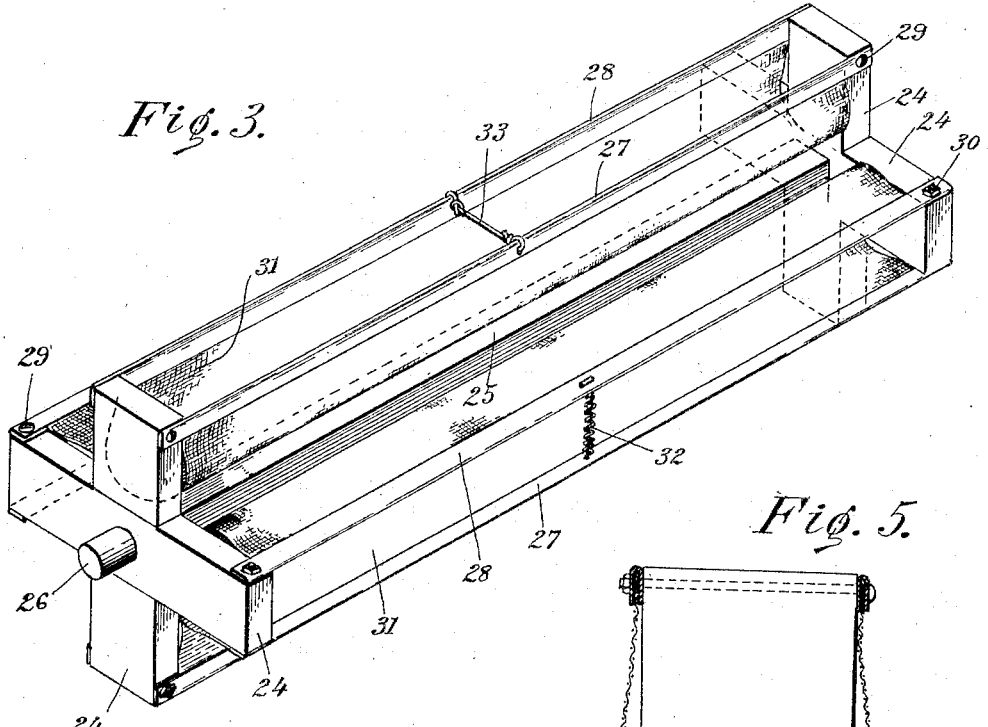
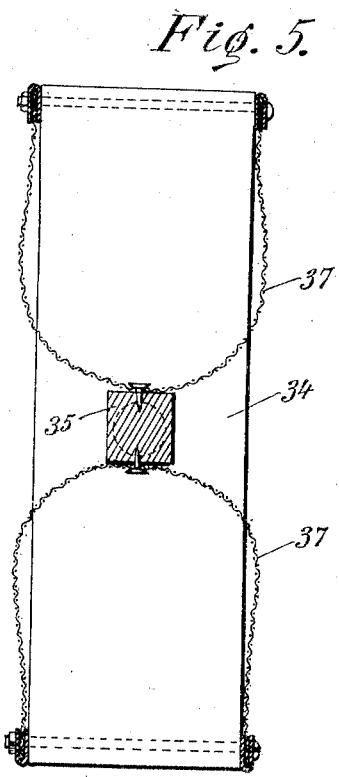
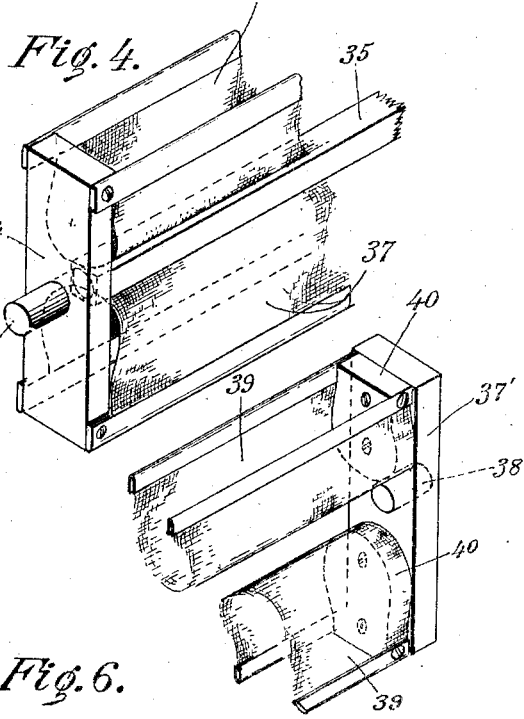
Inventor
S. J. Carr
By
Attorneys

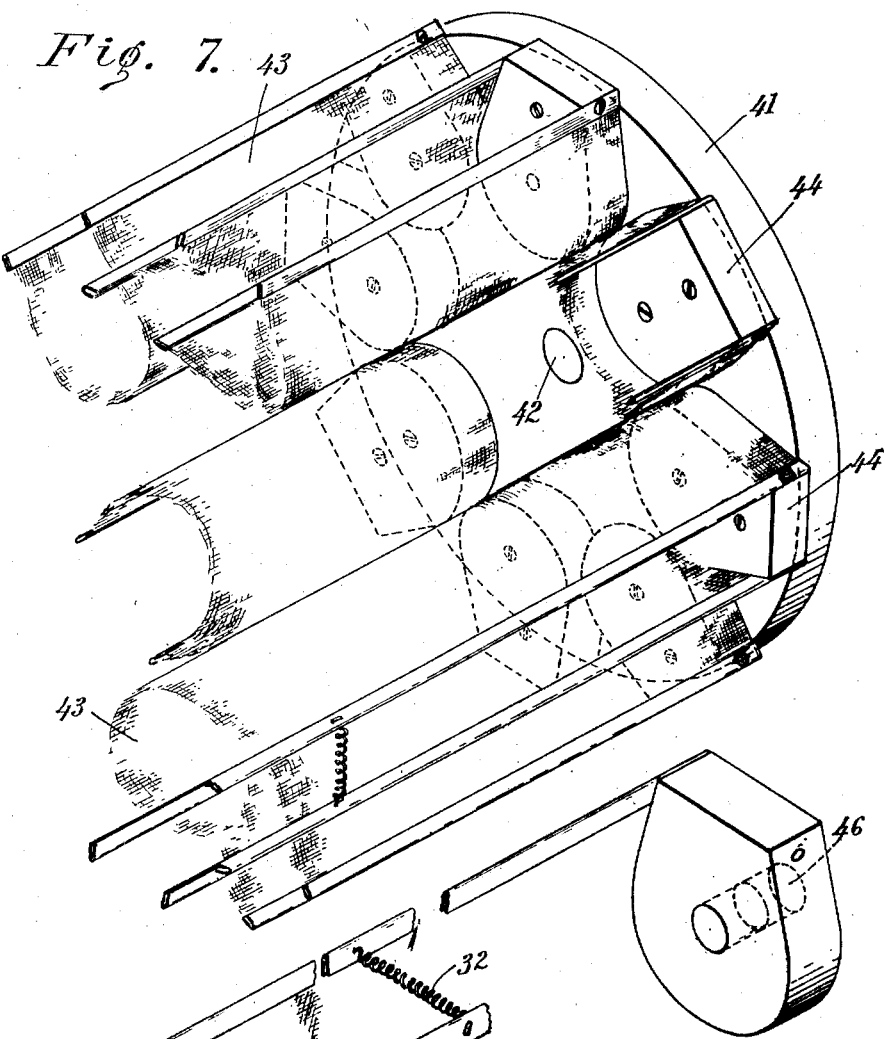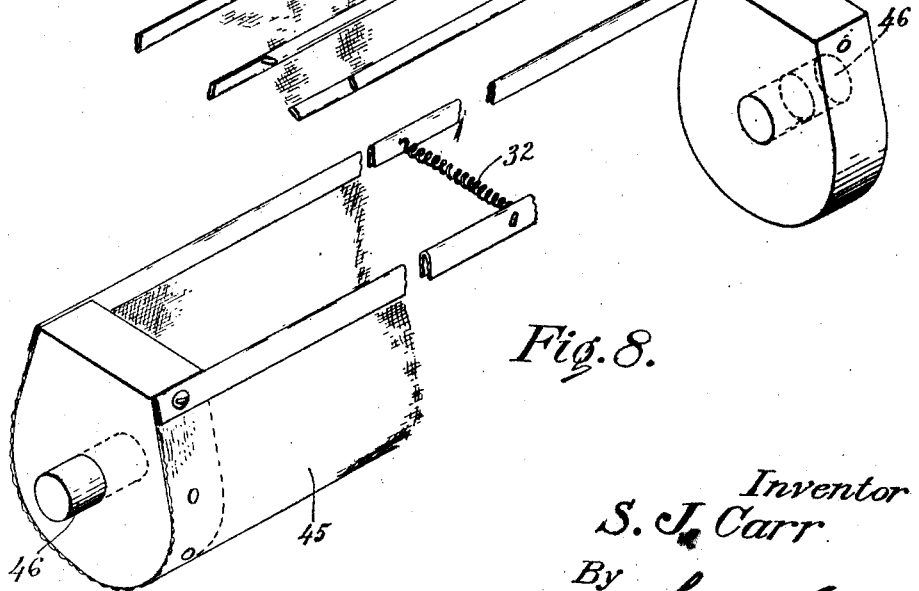

UNITED STATES PATENT OFFICE.

SAMUEL J. CARR, OF MUSKOGEE, OKLAHOMA, ASSIGNOR OF ONE-THIRD TO CHAUNCEY C. WAY, OF MUSKOGEE, OKLAHOMA.

EGG-TRAY FOR INCUBATORS.

1,334,225. Specification of Letters Patent. Patented Mar. 16, 1920.

Application filed February 5, 1919. Serial No. 275,179.

*To all whom it may concern:*

Be it known that I, SAMUEL J. CARR, citizen of the United States, residing at Muskogee, in the county of Muskogee and State of Oklahoma, have invented certain new and useful Improvements in Egg-Trays for Incubators, of which the following is a specification.

This invention relates to an improved tray for incubators and has as its primary object to provide a construction wherein the egg capacity of an incubator of given size will be materially increased.

The invention has as a further object to provide a construction wherein the eggs may without removal from the incubator be turned by simply turning the egg containers employed, liability of cracking the eggs when turning, being thus reduced to a minimum.

The invention has as a further object to provide an arrangement wherein the eggs may without removing the eggs from the containers be readily tested so that liability of cracking or breaking of the eggs while being tested, will be reduced to a minimum.

And the invention has as a still further object to provide a construction wherein the eggs will be firmly held within the container so that the eggs thus cannot pound against each other to cause the possible breakage thereof when the containers are manipulated.

Figure 2:
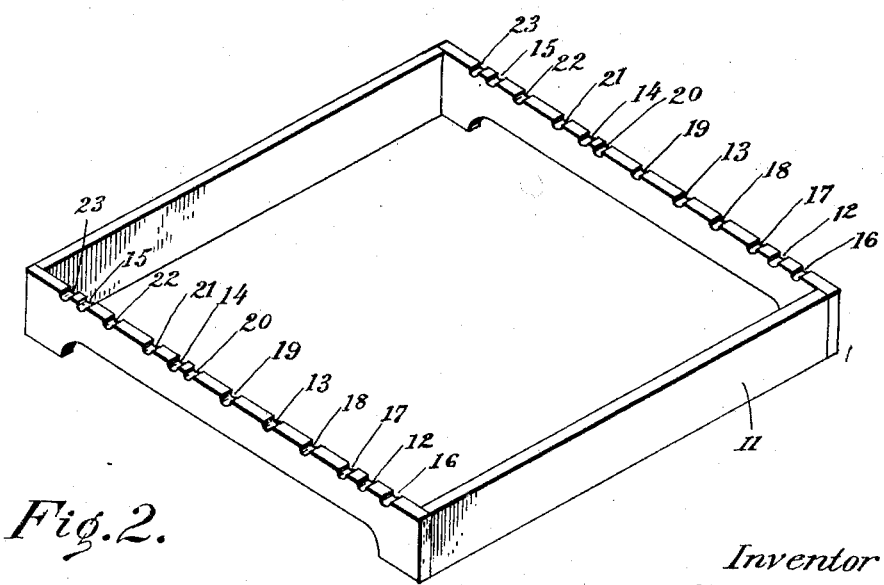

Other and incidental objects will appear hereinafter. In the drawings:

Figure 1 is a front elevation showing my improved egg tray in connection with a conventional type of incubator, Fig. 2 is a perspective view showing the container supporting rack of the tray in detail, Fig. 3 is a perspective view showing one of the containers in detail, Fig. 4 is a fragmentary perspective view showing a slightly modified form of container, Fig. 5 is a sectional view showing the modified form of container on an enlarged scale, Fig. 6 is a fragmentary perspective view showing a still further modified form of container, Fig. 7 is a fragmentary perspective view showing a further modified form of container, and Fig. 8 is a fragmentary perspective view showing a still further modified form of container.

Referring now more particularly to the drawings, I have, in Fig. 1, conventionally shown an incubator at 10. My improved tray is, as shown in this figure, adapted to removably fit within the incubator. The tray includes a container rack 11, which, as shown in detail in Fig. 2, is in the nature of a rectangular frame having parallel side and end bars respectively. Formed on the end bars at their upper edges are pairs of oppositely disposed notches which, for convenience, have been indicated at 12, 13, 14 and 15 respectively. The upper edges of the end bars are further provided with pairs of oppositely disposed notches which, for convenience, have been indicated at 16, 17, 18, 19, 20, 21, 22 and 23 respectively.

In connection with the rack I employ a plurality of containers, one of which is shown in detail in Fig. 3 of the drawings. Referring now more particularly to this figure, it will be seen that each of said containers includes terminal heads which are respectively formed of crossed bars 24 intersecting each other at substantially right angles, and extending between the heads is a connecting rod 25 rigidly securing the heads together. This rod is provided at its ends with trunnions 26 extending beyond the crossed bars of the heads at their points of intersection laterally with respect to the heads. Supported by the container is a plurality of pairs of strips 27 and 28 respectively, extending in substantially parallel relation between corresponding outer ends of the crossed bars 24, and securing the strips at their ends to corresponding side edges of said crossed bars are bolts or other suitable fastening devices 29 carrying nuts 30. The strips 27 and 28 are channel shaped in cross section, being each preferably formed from a piece of suitable resilient sheet metal, and connected with each pair of said strips is a reticulate basket body 31 preferably formed of screen wire and engaged at its edges in the channels of the side strips to be supported thereby between the crossed bars of the container heads. As best shown in Fig. 5, the basket body is of approximately semicircular cross section, or perhaps, more properly, horse-shoe shape, being in effect a trough whose mouth defined by the strips is narrower than its reticulate body. The latter is of a size to receive the major half of the average egg if stood on end, and the mouth is purposely contracted to retain the egg in the trough-like basket without need of a cover or other closure. In Fig. 3 it will be seen that the basket bodies are snugly received between said crossed bars so that these crossed bars thus close the bodies at their ends while, at their bottoms, the basket bodies rest upon the connecting rod 25 to be supported thereby. If desired, the basket bodies may be tacked or otherwise secured at their bottoms to the rod. Extending between and connecting the strips at the mouth of each basket, at a point substantially midway of the ends of the basket, is a tensioning spring 32 or, if desired, a cord or other suitable flexible element, as indicated at 33, may be employed for this purpose.

It is now to be observed that the rack 11 is of a size to receive four of the egg containers and these containers are removably fitted upon the rack so that the trunnions 26 thereof engage within the pairs of notches 12, 13, 14 and 15 respectively. The containers will thus be retained in spaced parallel relation upon the rack and, as will be clear, may be readily rotated thereon. The container baskets are, as particularly shown in Fig. 3, shaped to snugly receive eggs therein and the eggs are inserted in the baskets by spreading the side strips 27 and 28 thereof against the resilient action of the tensioning spring 32. However, if found necessary, the nuts upon the bolts 29 may be loosened so that the strips may be spread at their ends away from the bars 24 in order to permit free insertion of the eggs into the baskets. When the baskets are filled, the springs 32 will act to hold the pairs of side strips 27 and 28 flexed inwardly toward each other and thus tension the basket bodies about the eggs and tend to close the mouth thereof so that the eggs will thus be firmly held with respect to each other within the baskets and also against accidental displacement from the baskets. Since each of the containers is provided with four of the egg baskets while four of the containers are accommodated upon the rack 11, it will be seen that the tray is adapted to carry an unusual quantity of eggs. In fact, it has been demonstrated in practical use that the egg capacity of a given incubator of conventional type, is, by the use of my improved tray, substantially increased. The tray may, of course, as will be apparent upon reference to Fig. 1, be bodily removed from the incubator, should it be desired to remove the eggs therefrom. When so removed, the eggs within the egg baskets of the different containers may, since the basket bodies are reticulate, be readily tested with the aid of a suitable light by simply rotating the containers upon the rack so as to bring the eggs of each successive basket in proper position with respect to the light. Thus, possibility of breaking the eggs while testing them, is reduced to a minimum. Turning of the eggs may be accomplished by simply rotating the containers upon the rack 11 within the incubator. Thus, it is unnecessary to remove the tray in order to accomplish turning of the eggs and possibility of breaking the eggs, incident to turning them, is accordingly also reduced to a minimum.

In Figs. 4 and 5 of the drawings, I have shown a slight modified form of container. In this modification, the container heads are each formed by a single end bar 34 corresponding to the end bars 24 of the preferred construction. Joining these bars 34 is a connecting rod 35 corresponding to the rod 25 and provided at its ends with trunnions 36 corresponding to the trunnions 26. Supported between corresponding ends of the bars 34 are egg baskets each indicated as a whole at 37, these egg baskets being identical in construction with the egg baskets previously described. This modified construction, therefore, provides a double basket container and when this type of container is employed the trunnions 36 of the respective containers are engaged in the pairs of notches 16, 17, 18, 19, 20, 21, 22 and 23 upon the rack 11. The rack is thus adapted to carry a maximum of eight double basket containers. However, it will be observed that when the maximum number of containers is positioned upon the rack it will be necessary to remove the containers therefrom in order to accomplish the turning of the containers for turning the eggs held thereby.

In Fig. 6 of the drawings I have illustrated a further modified form of container which, however, closely resembles the prior modified structure. As in the modification shown in Fig. 4, the container heads, in this latter modification, are each formed by a single end bar 37' and projecting from each of said bars is a trunnion 38 corresponding to the trunnions 36 of the prior modification and adapted to serve a similar function. The connecting rod between the container heads is eliminated. Extending between corresponding ends of the bars 37' and connecting said bars are egg baskets each indicated as a whole at 39. These egg baskets are substantially identical with the egg baskets previously described with the exception that the egg baskets 39 are provided at their ends with end blocks 40 to which are secured the side strips of the baskets as well as the basket bodies, the connecting means between the side strips and the end blocks being identical with the means employed in the preferred construction for securing the side strips of the egg baskets to the crossed bars of the container heads. Securing the end blocks 40 to the bars 37' are screws or other suitable fastening devices so that the baskets are thus firmly connected with said end bars.

In Fig. 7 of the drawings I have shown a further modified form of egg container. In this modification, the heads of the container are each formed by a disk 41 and projecting from each disk axially thereof is a trunnion 42, these trunnions corresponding to the trunnions previously described and being designed to serve a similar function. Extending between and connecting the disks of the container is a plurality of radially disposed egg baskets each indicated as a whole at 43. These egg baskets are substantially identical with the egg baskets of the modification shown in Fig. 6, being provided with end blocks 44 corresponding to the end blocks 40 and secured to the disks by screws or other suitable fastening devices firmly connecting the baskets with the disks. This modified structure provides an arrangement whereby the egg capacity of the container is, as will be seen, materially increased.

In Fig. 8 of the drawings I have shown a still further modified form of container, this modification constituting an individual basket container. The heads of the container are each formed by one of the end blocks of the basket, the basket, indicated as a whole at 45, being substantially identical with the type of basket shown in Figs. 6 and 7 of the drawings. Projecting from the end blocks axially of the basket body are trunnions 46 for supporting the container upon the rack 11. As will be seen, this modified structure provides a very simple type of single basket container.

Having thus described the invention, what is claimed as new is:

1. An egg holder for use as described including a trough of reticulate material, its body of a size to receive the major half of an egg, means extending across the mouth of the trough for contracting said mouth, and closures for the ends of the trough.

2. An egg holding trough having a flexible body substantially semi-circular in cross section, strips along the edges of its mouth, and means extending transversely between said strips for drawing them toward each other to hold eggs within the body.

3. An egg container comprising spaced heads, a pair of flexible strips connecting said heads, a flexible trough-like body whose ends are connected with the heads and whose edges are connected with the strips whereby the latter stand at opposite sides of the mouth of said trough, and means for drawing the strips toward each other to contract said mouth.

4. In an egg tray, the combination with a rack having bearings in its opposite rails; of a container comprising two spaced heads, a rod rigidly connecting them and having trunnions mounted in said bearings, resilient strips connecting said heads and disposed in pairs remote from said rod, a flexible trough-like body whose edges are connected with the strips and whose ends are connected with the heads, the bottom of each body engaging said rod, and a spring connecting the midlength of said strips for drawing them toward each other and contracting the width of the mouth of said trough-like body.

In testimony whereof I affix my signature.

SAMUEL J. CARR. [L. S.]